Oct. 1, 1940.  F. A. KOLSTER  2,216,708
DIRECTIONAL RADIO SYSTEM
Filed Nov. 19, 1938  4 Sheets-Sheet 1
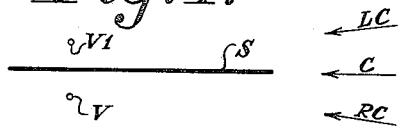
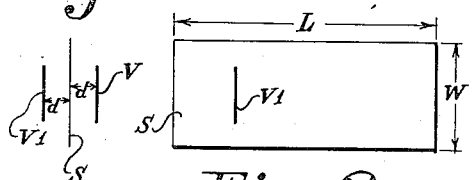
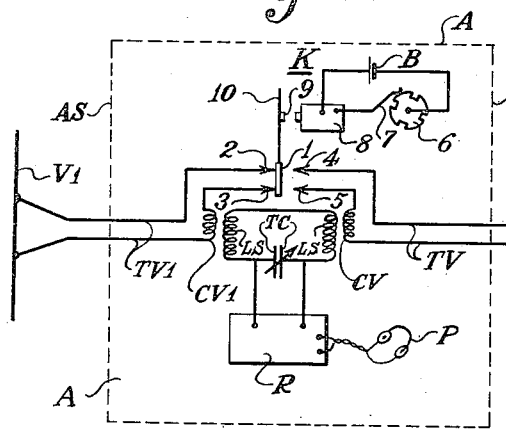
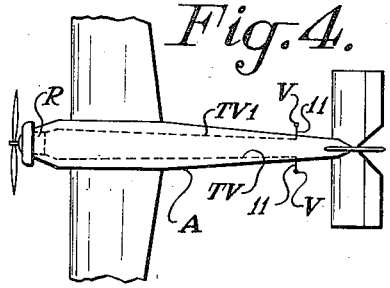
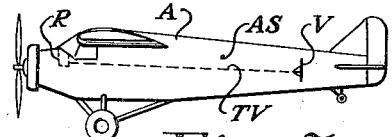
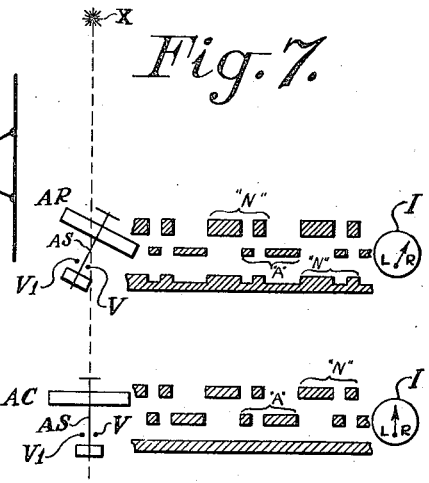
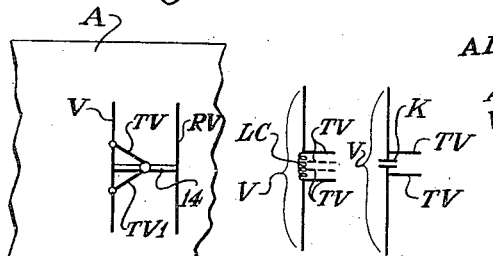
INVENTOR.
Frederick A. Kolster
BY
Cornelius D. Ehret
ATTORNEY.

Oct. 1, 1940.    F. A. KOLSTER    2,216,708
DIRECTIONAL RADIO SYSTEM
Filed Nov. 19, 1938    4 Sheets-Sheet 2
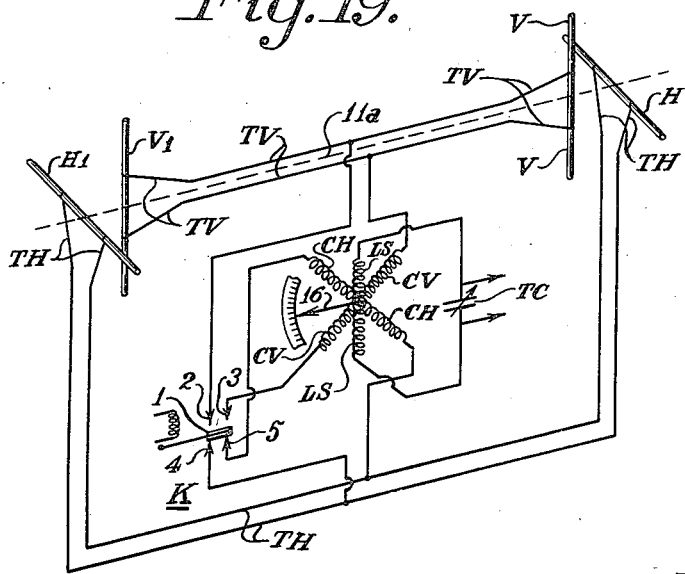
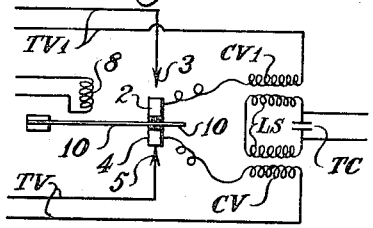
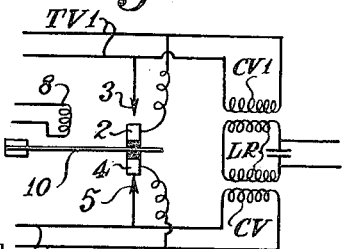
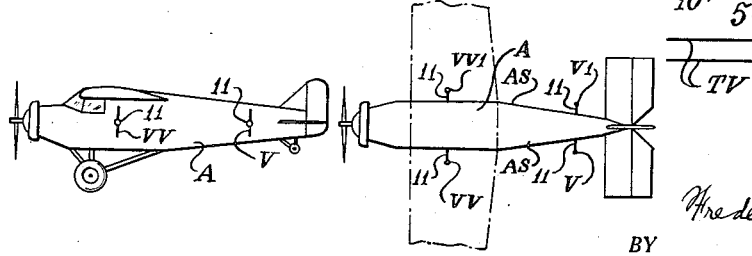
INVENTOR.
Frederick A. Kolster
BY
Cornelius D. Ehret
ATTORNEY.

Oct. 1, 1940.   F. A. KOLSTER   2,216,708
DIRECTIONAL RADIO SYSTEM
Filed Nov. 19, 1938   4 Sheets-Sheet 3

INVENTOR.
Frederick A. Kolster
BY
Cornelius D. Ehret
ATTORNEY.

Oct. 1, 1940.    F. A. KOLSTER    2,216,708

DIRECTIONAL RADIO SYSTEM

Filed Nov. 19, 1938    4 Sheets-Sheet 4

INVENTOR.
Frederich A. Kolster
BY
Cornelius D. Ehret
ATTORNEY.

Patented Oct. 1, 1940

2,216,708

UNITED STATES PATENT OFFICE 2,216,708

DIRECTIONAL RADIO SYSTEM

Frederick A. Kolster, Palo Alto, Calif.

Application November 19, 1938, Serial No. 241,309

23 Claims. (Cl. 250—11)

My invention relates to directional radio systems and particularly to mobile receiving stations, such as aircraft, sea-going ships and the like, utilizable for course-setting, determination of bearing or direction-finding.

In accordance with my invention, for directional radio reception or transmission, two antennae are disposed on opposite sides of an electrical conductor which, with respect to one or the other of the antennae, to greater or less extent cuts off radiation from or to a distant radio transmitting or receiving station upon change in the position or positions relative to each other of the station, conductor and antennae; more particularly, the antennae are so spaced from the conductor that during aforesaid cut-off of radiation to or from one of them, the radiation to or from the other antenna is, with respect to aforesaid distant radio station, substantially enhanced by reflection from said conductor.

Further in accordance with my invention, in reception or in transmission, a desired dissymmetry of the radiation-absorption characteristic may be procured by disposing the antennae unsymmetrically with respect to aforesaid conductor; alternatively or additionally, reflector or director antennae may be disposed on opposite sides of aforesaid cut-off conductor each at proper distance from one of the aforesaid receiving or transmitting antennae.

More particularly, the aforesaid antennae and interposed cut-off conductor may be disposed upon or carried by a moving vehicle or comprised in a mobile receiving system, for determination of its position or course with respect to a distant transmitting station.

In other forms of my invention, the antenna system on each of the opposite sides of the airplane body or equivalent comprises a pair of dipoles having their axes substantially at right angles to each other, with provision for angularly displacing both pairs of dipoles in unison about an axis normal to the sides of the plane; the corresponding dipoles on opposite sides of the plane are electrically coupled, and the energies received or absorbed by the different sets of dipoles are impressed upon the receiver and chopped or modulated. In a generally similar arrangement of two pairs of dipoles which are non-rotatably mounted, the dipoles are connected to field coils of a radio goniometer whose movable search coil is coupled to or comprised in the input stage of a suitable amplifier and detector system.

My invention further resides in the methods, systems and apparatus hereinafter described and claimed.

For an understanding of my invention, reference is to be had to the accompanying drawings, in which:

Figs. 1, 2 and 3 are plan, side elevational and end elevational views, respectively, of a conductive screen and dipole antenna arrangement;

Figs. 4 and 5 are, respectively, top plan and side elevational views of an airplane provided with the directional antenna system of Figs. 1 to 3;

Fig. 6 is a diagram of an antenna system of Figs. 1 to 5 with associated receiving apparatus;

Figs. 6A and 6B show arrangements for changing the electrical length of an antenna of Figs. 1 to 6;

Figs. 6C and 6D illustrate modifications of a relay arrangement shown in Fig. 6;

Figs. 6E and 6F are side elevational and plan views respectively of an airplane provided with antennae in addition to those shown in Figs. 4 and 5;

Fig. 7 is an explanatory figure, referred to in description of Figs. 1 to 6 and others;

Figure 14:
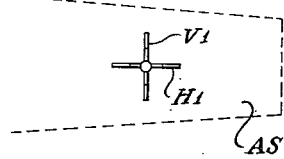
Figure 13:
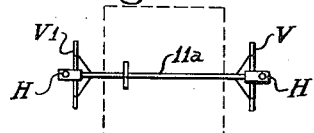
Figure 15:
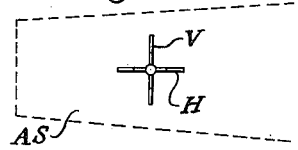
Figure 16:
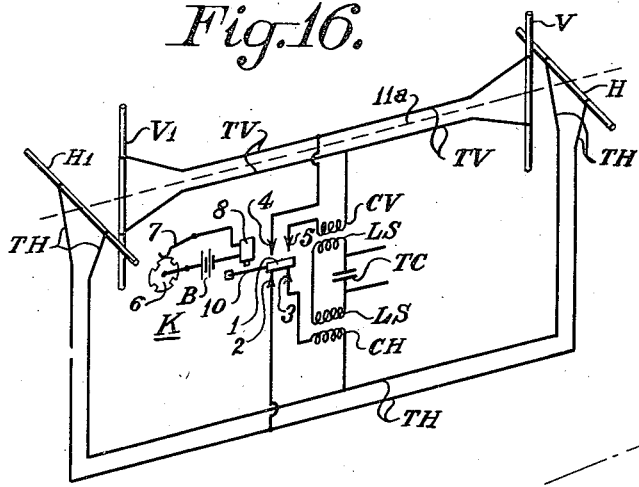
Figure 17:
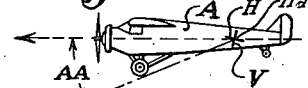
Figure 18:
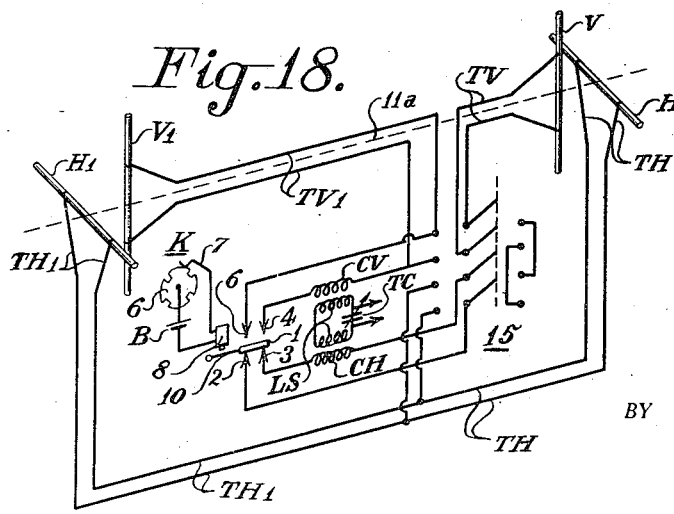
Figure 9:
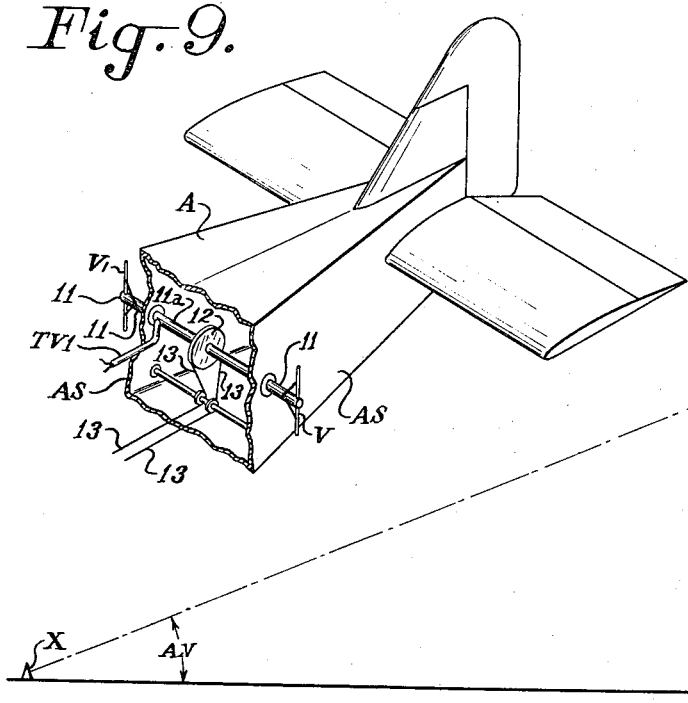
Figure 10:
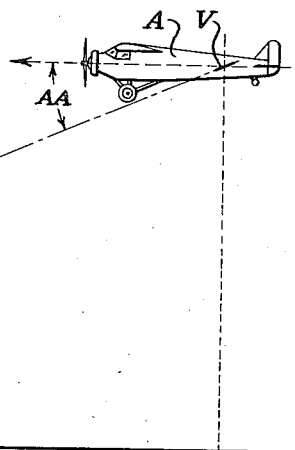
Figure 8:
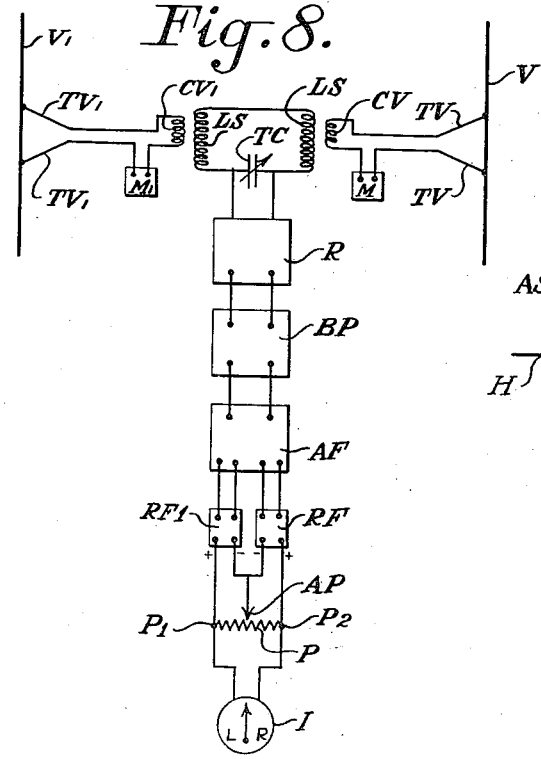
Figure 12:
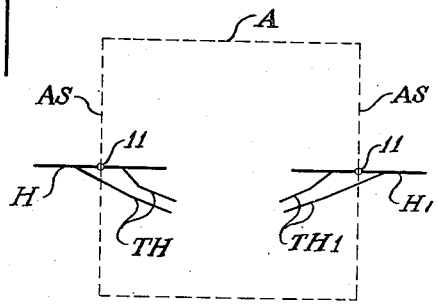

Fig. 8 diagrammatically shows the antenna system of Figs. 1 to 6 with associated apparatus suited to produce a visible off-course indication;

Fig. 9, in perspective, and with parts broken away, illustrates a rotatable mounting for the antenna system of Figs. 1 to 6;

Fig. 10 is an explanatory figure, referred to in description of the use of the arrangement shown in Fig. 9;

Fig. 11 illustrates a modified form of antenna system;

Fig. 12 illustrates a dual antenna system suitable for reception of horizontally polarized waves;

Figs. 13, 14 and 15 diagrammatically show in front elevation, left side elevation, and right side elevation, respectively, a modified form of antenna system comprising a pair of crossed dipole antennae on each side of the airplane body or equivalent;

Fig. 16 is a diagram of a directional receiving system using the antenna arrangement of Figs. 13–15;

Fig. 17 is an explanatory figure referred to in discussion of the use of the system of Fig. 16;

Fig. 18 is a modification of the system of Fig. 16 to provide both for course indication and for determination of the vertical angle or vertical bearing of, or distance to, the transmitting station;

Fig. 19 illustrates a modification of the system of Fig. 16 utilizable when the crossed dipole antenna are fixed or non-rotatably mounted with respect to the plane.

For preliminary discussion of the principles underlying my invention, reference is made to Figs. 1, 2 and 3 in which S is an electrical conductor, such as a metallic plate or screen of suitable conducting material, for example copper, whose length L is long compared to the wave-length of the radiation to be received, for example, at least several wave-lengths long, and whose height W is preferably at least one-half wave-length long.

Since, for some applications of my invention, the radio frequency energy to be received is of ultra short wave-length, for example ten meters or less, or approximately from one meter to ten meters, the physical dimensions of such screen are not excessive and are comparable with the length and height of an airplane body. Near one end of the screen are disposed two similar antennae V and VI with their axes parallel to each other and, at optimum, normal to the general direction of radiation to be received from a remote transmitter. Preferably each of the antennae is a dipole, an antenna whose electrical length is substantially equal to one-half wave-length of the energy to be received by it. Each of the antennae V, VI is at a distance $d$ from the screen S such that the screen acts as a reflector for energy to be absorbed by one or the other of the antennae when the screen is out of alignment with the direction of transmission of such energy or bearing of the transmitting station; the distance $d$ which in a given installation, as upon an airplane, affords the greatest difference between the magnitudes of the energies absorbed by the antennae for small misalignment of the screen, can be determined empirically. The antennae are preferably disposed for physical symmetry with respect to the screen, and if electrical dissymmetry obtains, compensation may be effected in the associated receiving apparatus. As shown in Figs. 1 to 3, the dipoles V, VI are shielded from each other by the screen S.

When the direction or bearing of the transmitter, as indicated by arrow C, coincides with the axis of symmetry of the screen-antenna system, the antennae V, VI absorb equal amounts of energy. When the direction or bearing of the transmitter is that of the arrow LC, the antenna V is more or less completely shielded from the transmitter by the screen S, in the sense that radiation to antenna V is at least to substantial extent intercepted or cut off; and, at the same time, the amount of energy absorbed by antenna VI is increased because of reflection thereto from the screen S. Similarly, when the direction of the transmitter is that indicated by arrow RC, the antenna VI is to greater or lesser extent shielded by screen S because it to greater or less extent intercepts or cuts off from antenna VI radiation from the transmitting station; whereas the antenna V is not then so affected and may, because of the reflecting effect of the screen S, absorb more energy than when the axis of symmetry of the antenna system corresponds with the direction of transmission.

When an airplane has a metal body suited to serve as screen S of Fig. 1, the two antennae V, VI are suitably mounted on standards II projecting from the sides of the body AS of the plane A near the tail, Figs. 4 and 5, and suitable transmission lines TV and TVI extend within the body from the antennae to receiving apparatus R suitably disposed for operation by the pilot or other operator. If the plane body is not metallic and so incapable of cutting off radiation, a screen S is disposed, as within the fuselage, vertically and lengthwise thereof to effect the relations expressed in discussion of Figs. 1 to 3. Since voltage nodes exist at the centers of the antennae, it is not necessary to insulate them from the plane body or equivalent screen if centrally supported as shown; they may, however, be mounted upon suitable insulators. When the airship is of large dimensions—it may be a dirigible—larger antennae may be used for reception of longer wave-lengths, for example, 100 meters or even longer; for reception of longer wave-lengths on smaller craft without loss of the effect of screen S formed by its body, or equivalent structure, each antenna may be electrically lengthened or loaded, Fig. 6A, by connecting between separated sections thereof a loading coil or inductance LC of proper value to resonate the antenna to the wave-length of the radiation to be absorbed. The conductors of the transmission line TV, or TVI, as the case may be, may be connected to the terminals of coil LC or to taps intermediate the terminals equally electrically spaced from the voltage node in the antenna system and preferably at the points effecting optimum match of the impedance of the transmission line with the impedance of the antenna. If, on the other hand, the antennae are too long, each may be shortened electrically to resonate it by connection between separated portions thereof of a condenser K of adjusted or selected capacity, Fig. 6B.

The antennae V, VI are preferably mounted as near the tail end of the airplane as practical and consistent with the relations shown in Fig. 1 so that, assuming the plane is headed for the remote transmitting station, small deviation between the fore and aft axis of the airplane and the bearing of the transmitting station is sufficient to cause marked cut-off of radiation, by the screening effect of the airplane body or equivalent screen S, one or the other of the antennae. To afford like sensitivity to small deviations when the airplane is headed away from the transmitting station, another pair of antennae VV, VVI, Figs. 6E and 6F is mounted near the nose of the airplane and used instead of antennae V, VI. The relation of antennae VV, VVI to the screen S comprised in or formed by the body of the airplane is, for radiation from a transmitter to the rear of the airplane, the same as the relation of antennae V, VI to the screen for radiation from a transmitter ahead of the airplane. A simple double-throw switch may be used to connect either of the two antennae system to the receiver R.

Figure 6G:
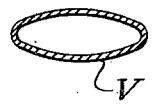
Fig. 6G is a cross-section of one of the antennae.

Particularly in the rotatable arrangements hereinafter described, the antennae are supported solely at or near their centers and are for simplicity so mounted when non-rotatable; for mechanical rigidity, the conductor comprising each antenna is preferably of streamlined cross-section, for example, a tube of copper, aluminum, or like metal or alloy, which is of elliptical shape, Fig. 6G, mounted with its major axis substantially parallel to the fore and aft axis of the airplane.

In the arrangement shown in Fig. 6, the circuit including the transmission line TVI from antenna VI and the coupling coil CVI is completed, when the movable contact I bridges the contacts 2, 3, to impress the energy absorbed by antenna VI upon a circuit, including inductances LS, LS and tuning capacity TC, connected to or forming the input circuit of a conventional radio receiver R, preferably including one or more stages of radio frequency amplification, a detector and an audio frequency amplifier; if of the superheterodyne type, the receiver R includes a high-frequency oscillator, an intermediate frequency amplifier, and first and second detectors. The audio output of the receiver R is fed to a loud speaker, or to head-phones P worn by the pilot or operator. When the transmitted energy is unmodulated at the transmitter, the receiver will include means for locally effecting modulation, as by a beat-frequency oscillator, for producing an audible tone in the loud speaker or head-phones.

When contact 1 is moved to the right of the position shown in Fig. 6 to bridge the contacts 4, 5, the antenna VI is effectively decoupled from the input circuit and substantially concurrently the antenna V is coupled to the input circuit by completion of the circuit including the transmission line TV and the coupling coil CV.

As an alternative to opening of the circuit including the coupling coils CV, CVI, these coils may be alternately short-circuited (Fig. 6D) so that as before, first one antenna and then the other is coupled to the input circuit LS, TC. Instead of using a bridging contact on reed 10 (as shown in Figs. 6, 16, 18, 19 and 21) to complete the coupling coil circuits or to shunt these coils, the contacts 2 and 4, Figs. 6C and 6D, may be mounted upon and insulated from the reed 10 and from each other.

The means for actuating reed 10, alternately to couple the two antennae V and VI to the receiver RS, may comprise an automatic key K consisting of keying disk 6 continuously rotated in any suitable manner, as by a small motor or any rotating part of the plane motor or auxiliaries, and a contact 7 which, during rotation of the disk, alternately makes and breaks a circuit including a suitable source of current, such as battery B, and an electromagnet 8 whose armature 9 is carried by a reed 10 upon which is mounted the contact 1 of Fig. 6, or contacts 2 and 4, Figs. 6C and 6D. The relative proportions of the conducting and non-conducting parts of disk 6 may be such that the making and breaking of the circuits of the coupling coil CV and CVI repeatedly forms interlocking signal impulses; for example, from the energy received by antenna VI the character N of the International Code is formed; and making and breaking of the circuit including the coupling coil CV, repeatedly forms the character A from the energy received by antenna V. The two characters are accordingly interlocking in the sense that the production of the dot of each character A occurs during the space between the dash and dot of character N, and the dash of each letter A occurs during the interval between the dot of one letter N and the beginning of the dash of the next letter N; of course, any other combination of interlocking groups of long and short impulses may be used.

Accordingly, when an airplane AC, at the middle of Fig. 7, is on its course with the longitudinal axis of its body AS in alignment with the direction or bearing of the transmitting station X, the energies received by the antennae V and VI are equal; consequently, the characters A and N formed by the aforesaid modulation or chopping of the received energies are of equal intensity as heard by the pilot or operator, and since the characters are interlocking, the auditory effect is that of a continuous signal of constant intensity.

If the plane is headed to the right of the bearing of or direction to the transmitting station, as indicated by the airplane AR in the upper part of Fig. 7, the energy received by the antenna VI is substantially greater than that absorbed by the antenna V because of the screening and reflection effects of the airplane body AS, and consequently the continuous note heard by the pilot is of varying amplitude, and these variations in amplitude repeatedly form the character N. If the plane is so far off course that substantially no energy is absorbed by the antenna V because of the screening or cut-off effect, the pilot hears the letter N recurrently and alone, rather than as a variation in amplitude of a constant tone or pitch.

Similarly, if the plane is headed toward the left of the transmitting station X, as indicated by airplane AL in the lower part of Fig. 7, the energy received by the antenna V is substantially greater than that absorbed by the antenna VI, and the pilot hears the character A repeated so long as the airplane is off course in that direction.

The two series of dots and dashes and their integrated effect shown to the right of each of the several airplanes in Fig. 7, pictorially illustrate effects above described.

When equipped with this type of receiving system, an airplane may be guided to or from a transmitting station or radio-beacon from any direction, the pilot setting his own course, in contradistinction from prior systems in which the transmitting station radiates its energy directionally in beams to set a course for and to be followed by the pilot. The disadvantages of this prior method are many; for example, it enforces approach to the station in a limited number of fixed directions, so enforcing flight in lanes whose crowding in thick weather is dangerous; moreover, practice of such prior beam method is accompanied by undesirable phenomena, including those known as "multiple discontinuous courses" and "signal reversals," which mislead and bewilder airplane pilots.

By mounting the antennae V and VI so that they may be rotated or angularly displaced in unison with respect to the airplane, the system described may also be utilized to determine the vertical bearing of or angle to the transmitting station; therefore, the distance to the station, if the altitude of the plane be known, can be determined.

As shown in Fig. 9, the dipoles V and VI may be mounted upon a common support 11a which extends through and projects beyond the body of the plane, and which, within the body, is provided with a pulley 12 over which passes the cable 13 for adjustment by the pilot, or operator, of the angular position of the antennae with respect to the airplane. The means adjustable by the pilot to vary the angular position of the antennae is provided with a suitably calibrated scale so that, at all times, the angular position of the antennae with respect to the axis of the plane is ascertainable. Any other suitable arrangement for correlating the movements of the antennae to an indicating element adjustable by the pilot may be used. To ascertain the vertical angle AV, Fig. 10, the pilot or operator, with the line of flight corresponding with the direction, in a horizontal plane, to the transmitting station, adjusts the angle AA, Fig. 10, between the longitudinal axes of the antennae and the horizontal longitudinal axis of the airplane until the signal heard or otherwise observed is at a minimum. This at once determines the magnitude of the vertical angle AV and, the altitude of the airplane being known, distance to the transmitting station can be calculated. It is, of course, assumed the plane is provided with the usual apparatus, such as an altimeter, for indicating at least the approximate height of the plane from earth.

The system shown in Fig. 8 for producing a visible indication of the relation between the instant course of the plane and the true course to the transmitting station also utilizes a dual antenna system of the character shown in Figs. 1 to 5. The energy absorbed by antenna VI is chopped or modulated at a suitable audio-frequency F by modulator M, of any suitable type, and the energy absorbed by the antenna V is chopped or modulated at a suitably different audio-frequency FI by modulator MI. Both high-frequency energies modulated at the different audio-frequencies F and FI are impressed upon the receiver R comprising, for example, one or more stages of radio-frequency amplification and a detector.

The audio-output of the receiver R has two audio-frequencies corresponding with the modulation frequencies F, FI. The amplitude of the audio-frequency FI, as appearing in the output of the receiver R, is determined by the amount of radio-frequency energy absorbed by antenna VI, and the amplitude of the audio-frequency F is determined by the amount of radio-frequency energy absorbed by the antenna V. If desired, these audio-frequency energies may be fed to separate speakers or head-phones and compared audibly to ascertain whether or not the plane is on its course; but because it is difficult for a person to compare the relative intensity of two notes of different pitch, it is preferred that the amplitudes of the two frequencies F and FI be compared visibly. To that end the two frequencies F and FI are independently amplified, rectified by individual rectifiers RF, RFI, and their relative amplitude shown visibly by indicator I.

In the particular arrangement shown in Fig. 8, the visual indicator I may be a direct-current galvanometer with its terminals connected to a balancing resistance P having its movable contact AP connected to the common terminals of like polarity of the rectifiers RF and RFI and with its terminals PI, P2 connected to the other terminals, for example the positive terminals, of the rectifiers. The contact AP is so adjusted that when the plane is known to be on its course, the pointer of the deflection instrument is in its null or central position, Fig. 8; in other words, contact AP is so adjusted, upon installation of the system, the outputs of the rectifiers, insofar as the effect upon the indicating instrument I is concerned, are equal and opposite when there exists equality of the energies absorbed by antennae V and VI. This adjustment of impedance P compensates for any electrical dissymmetry of the antennae with respect to screen S, comprised in or formed by the body of the airplane, existing when the airplane is in line with the bearing of a transmitting station.

As an alternative, the modulators M, MI may be radio-frequency oscillators of frequencies different from each other and from the frequency of the beacon to produce different intermediate or beat frequencies which are independently amplified, rectified by rectifiers RR, RFI and compared for difference in magnitude by indicator I or equivalent.

When the airplane is headed off to the right of its course, indicated by plane AR, Fig. 7, the radio-frequency energy absorbed by antenna V predominates and, consequently, the audio-frequency FI predominates in the output of the receiver R to effect deflection of the movable elements of the indicator I to the right, as shown to the right of airplane AR in Fig. 7; conversely, if the airplane is headed off to the left of its proper course, airplane AL of Fig. 7, the antenna V absorbs more energy than antenna VI, and consequently the frequency F predominates in the output of the receiver to effect deflection of the pointer of indicator I to the left. As shown in Fig. 8, these may be interposed between the receiver R and the rectifiers RF, RFI, a band-pass filter BP for the frequencies F and FI, and an audio-frequency amplifier AF having one or more stages.

The antennae V, VI of Fig. 8 may be permanently or non-rotatably mounted upon the airplane; or, as shown in Fig. 9, they may be rotatably mounted to enable the pilot additionally to determine his vertical angle with respect to the transmitting station or the distance thereto. For this additional purpose, another indicator or indicators may be included in the output circuit of the rectifiers RF and RFI to indicate when the energies absorbed by the antennae V, VI are at a minimum.

With the dual antenna system exemplified by Figs. 1 to 3, the signal energies absorbed by the antennae V, VI are equal to each other whether the airplane is flying directly toward or directly away from the transmitting station X; and the amplitudes of the interlocking signals as heard by the pilot or operator may be approximately equal for both cases, so that although the pilot can check the direction to or the bearing line of the transmitter, he may not be able to ascertain the sense of direction, except by other apparatus as a magnetic, gyroscopic or other compass. By the use, with each of the antennae V, VI, of a reflector or director, for example, another half-wave dipole mounted in back or in front of the antennae at suitable distance therefrom, the ratio between the signal intensities for the reversed positions of the airplane in the line of direction to the transmitter is so enhanced the pilot may determine both the sense and line of direction. Each reflector or director introduces a dissymmetry in the absorption characteristic of the dipole with it associated on the same side of screen S, so that when the longitudinal axis of the screen coincides with the bearing of the transmitting station the magnitude of energy absorption by the dipole, V or VI, is not independent of the sense of direction of the transmitter; on the contrary, with said axis of the screen as aforesaid coinciding with the bearing of the transmitting station, if the dipole V or VI is between its associate reflector and the transmitting station the energy absorbed by the dipole V or VI is materially greater than when its associate reflector is between it and the transmitter.

As shown in Fig. 11, the reflector RV for antenna V may be mounted upon a cross-piece 14 which also supports the antenna V, and is positioned in alignment therewith in a plane substantially parallel to a vertical plane including the longitudinal axis of the airplane.

The antenna systems thus far described are suited for best reception of vertically polarized radiation, and the antenna system of the transmitter or beacon X should therefore be constructed so that at least most of its radiation is vertically polarized.

Whether the radiation from the transmitter be horizontally or vertically polarized, so long as it is absorbed by the antenna system, the directional effects are as above described. The best signal intensity is obtained when the plane of the antenna corresponds with the plane of the polarization of the energy, but irrespective of the plane of polarization of the received energy, the direction indication obtained by the procedure above is the same.

For enhanced sensitivity to horizontally polarized radiation, there may be utilized the antenna arrangement shown in Fig. 12. The two antennae H and HI, for example dipoles, are supported horizontally and transversely of the airplane body AS with their adjacent ends inside of the body and with their remote ends projecting beyond the sides of the body. When the antennae are dipoles, they may be electrically as well as mechanically connected to the plane body at or suitably adjacent their midpoints or points of potential anti-nodes. The metal body of the plane, or equivalent screen S, cuts off radiation to the exposed portion of antenna H, or HI, when the plane deviates from its course toward or from the distant transmitter. The antennae are provided with individual transmission lines TH, THI corresponding with the transmission lines TV, TVI of Figs. 6 and 8, for transmitting their absorbed energies to a receiving system corresponding with Fig. 6 or Fig. 8. For optimum transfer of energy from each antenna, its impedance is suitably matched to the impedance of its transmission line in any known manner; for example, the line is fanned out and tapped to the antenna at points thereof suitably distant from its potential node.

In the arrangement shown in Figs. 13, 14 and 15, the dipoles V and VI are suitably mounted, as in the arrangement of Fig. 9, for rotation about an axis extending transversely of the body A of the plane, and in addition, there is also mounted upon this same rotatable support the two horizontal dipoles H and HI having their axes parallel to each other and to the longitudinal axis of the plane. The antennae V, H form one pair of crossed dipoles and the antennae VI, HI form a second pair of crossed dipoles. For convenience, when the dipoles are to be rotated, in accordance with some aspects of my invention, they are mounted on a common support but this is not essential; the important relation is that the antennae V, VI, on one hand, and antennae H, HI, on the other, are at different angles to the wave front of received energy when the airplane is headed toward or away from the source, or transmitter of that energy.

The two vertical dipoles V and VI are connected in parallel, as by their transmission line TV, Fig. 16, and are coupled to the tuned circuit LS, TC by the coupling coil CV when the contacts 4, 5 in series therewith are bridged by the vibrating contact I of the automatic keying system K. Similarly, the two horizontal dipoles H and HI are connected in parallel by their transmission line TH and their absorbed energy is impressed upon the tuned circuit LS, TC by the coupling coil CH when the contacts 2 and 3 are bridged by contact I. This arrangement for coupling first one and then the other antenna system to the tuned circuit is similar or equivalent to those shown in Figs. 6, 6C and 6D; for this automatic keying arrangement may be substituted the modulators of Fig. 8.

With the arrangement of Figs. 13 to 16, the pilot or operator can determine the direction in a horizontal plane, to the transmitting station, and also the direction in the vertical plane to that station. With the airplane on its course, for determination of the vertical bearing, the four antennae are moved in unison about their axes II by the pilot until the audible or visible signal indicates the energy absorbed by the dipoles V, VI is equal to the energy absorbed by the dipoles H, HI. From the reading of a scale associated with the linkage or mechanism which effects the adjustment of shaft II, the pilot may read or ascertain the angle AA, Fig. 17, and knowing his altitude, may determine the distance to the transmitting station. The crossed dipole arrangement of Fig. 17 is superior to that of Fig. 9 in accurate determination of the vertical angle, or the bearing in a vertical plane, of the transmitting station and may be used in guiding the airplane to a landing.

The arrangement shown in Fig. 18 is an alternative mode of connecting the antenna system of Figs. 13 to 15 to the receiver of Fig. 6 or Fig. 8. When the movable contacts of the four-pole double-throw switch 15 are thrown to the left, the connections correspond with those shown in Fig. 16; that is, the two vertical dipoles V, VI are connected in parallel to the coupling coil CV and the two horizontal dipoles H, HI are connected in parallel to the coupling coil CH. When the movable contacts of the switch 15 are thrown to the right, the horizontal dipoles H, HI are disconnected, dipole V is connected to the coupling coil CH, and dipole VI is connected to the coupling coil CV, as shown in Figs. 6 and 8. In brief, the pilot, to ascertain whether or not he is on his course, throws a switch 15 to the right, and if he hears or sees the absorbed energies of the two antennae V, VI are not equal, he suitably changes his course to that for which obtains equality of said absorbed energies. Then, to ascertain the vertical angle to the transmitting station, or the distance therefrom, the switch 15 is thrown to the left, to effect the connections of Fig. 16. The two pairs of crossed dipoles are then rotated in unison about axis IIa until in such position there is no difference between the energy absorbed by the vertical dipoles and the energy absorbed by the horizontal dipoles; in such position the angle AA between the bisector of the angle between the crossed dipoles and the longitudinal axis of the airplane is equal to the vertical angle AV, Fig. 17.

By using a radio goniometer, the antenna systems of Figs. 9 and 13 to 15 may be fixedly mounted upon the airplane; for example, the antenna V, VI of Fig. 9 would be mounted with their axes permanently vertical, and the pairs of antennae V, VI and H, HI of Figs. 13 to 15 would be mounted with the dipoles V, VI vertical and with the dipoles H, HI horizontal. Referring to Fig. 19, the coupling coils CV and CH are mounted at right angles to each other to comprise the field coils of a goniometer and the coil LS of the tuned circuit is suited to rotate within the two coils CV and CH to serve as the search coil of the goniometer. From the index 16, movable with the adjustable coil LS, may be read the vertical angle AA of Fig. 17. The arrangement of Fig. 19 may include a reversing switch, such as switch 15 of Fig 18, to provide either for course indication or determination of vertical angle. The absorbed energies to the coils CV and CH may be chopped, as by the automatic keying arrangement of Fig. 6, or may be modulated by modulators M, M1 of Fig. 8.

It is understood that although the directional receiving systems described are particularly suited for guidance of airplanes, they may be used on other vehicles such as dirigibles, boats, submarines, and the like.

It is further understood that the antenna system of Figs. 1 to 3 may be used for directional transmission as well as directional reception particularly of ultra short-wave radiation, that is, radiation having wave-lengths of less than about ten meters.

There is disclaimed herefrom, in regard to shielding, screening, interception or cut-off effected by structure disposed between and functionally related to antennae, absorption of radiation, or deformation of the wave front or field of radiation, in or by a non-conducting body or dielectric.

What I claim is:

1. A radio course-determining system for an airship comprising a pair of antennae so supported at each side of said airship that the antennae of each pair are at an angle with respect to each other and at different angles with respect to the wave front of energy radiated from a distant transmitter, means for rotating all said antennae in unison about a horizontal axis, means for connecting each antenna of a pair in parallel with the corresponding antenna of the other pair, and means for determining the distance to said transmitter comprising means for comparing the magnitude of the energy absorbed from said transmitter by one set of said parallel-connected antennae with the magnitude of the energy absorbed from said transmitter by the other set of parallel-connected antennae.

2. A radio course-determining system for an airship comprising two pairs of antennae so supported at opposite sides of the airship that the antennae of each pair are at an angle with respect to each other and at different angles with respect to the wave front of the radiant energy, radio-receiving apparatus, and switching means operable to a position to connect in parallel the corresponding antennae of the pairs and independently to connect the two sets of parallel-connected antennae to said receiving apparatus, and operable to another position to connect said receiving apparatus to antennae of said pairs.

3. A radio system comprising a station for transmitting polarized radio-frequency energy, a mobile receiving station having antennae mounted with their axes substantially parallel to the plane of polarization, a conductive screen disposed between said antennae and extending beyond them in a direction parallel to the course of the vehicle to cut off radiation to one or the other of them in accordance with the sense of deviation of the course with respect to the bearing of said transmitting station, and means for comparing the magnitudes of the energies absorbed, respectively, by said antennae.

4. A radio system comprising a station for transmitting vertically polarized energy of ultra-short wave-length, an airship receiving station having a pair of crossed dipoles supported at each of opposite sides thereof, means for rotating said pairs of dipoles in unison in vertical planes parallel to each other, radio-receiving apparatus at said receiving station, and means for comparing the magnitude of the resultant of the energies absorbed by the corresponding dipoles of the pairs with the resultant of the energies absorbed by the other corresponding dipoles of the pairs.

5. A radio antenna system for directional reception or transmission from or to a distant transmitting or receiving station comprising a pair of dipoles, and an electrically conductive screen so disposed between said dipoles and of such length and height greater than the length of said dipoles, that it cuts off interchange of radiation between one of said dipoles and said distant station upon change in the angular position or positions relatively to each other of said station, said screen, and said dipoles through a substantial angle substantially throughout which it, by reflection therefrom, effects enhancement of interchange of radiation between said distant station and the other of said dipoles.

6. In combination with an airship, a pair of antennae disposed on opposite sides of and near one end of the airship's body which is or comprises an electrical screen effective to shield said antennae from each other, another pair of antennae disposed on opposite sides of said body near the other end thereof and shielded from each other by said screen, and radio receiving apparatus selectively connected to one or the other of said pairs of antennae for indicating electrical dissymmetry of the selected pair with respect to said screen for radiation from a transmitting station.

7. A directional antenna system for transmission to or reception from a distant station, comprising a pair of antennae, and an electrical conductor of such dimensions and so disposed between and so spaced from said antennae that with respect to said distant station it causes cut-off with respect to one or the other of said antennae upon change in the angular position or positions relatively to each other of said station, said conductor, and said antennae from a position or positions in which both of said antennae are concurrently effective for reception from or transmission to said distant station.

8. A radio direction-finding system for determining the bearing of a transmitting station comprising an electrically conductive screen an axis of which is directable with respect to said station, antennae so disposed on opposite sides of said screen that radiation to one of them from said station is cut off by said screen upon misalignment of its said axis with the bearing of said station, and means for comparing the magnitudes of the energies absorbed by said antennae.

9. A directional antenna system for transmission to or reception from a distant station, comprising a pair of antennae, and an electrically conductive structure directable with respect to said station of such dimensions and so disposed between and so spaced from said antennae that with respect to said distant station it causes radiation cut-off with respect to one or the other of said antennae upon change in the angular position or positions with respect to each other of said station, said conductor and said antennae from a position or positions in which both of said antennae are concurrently effective for reception from or transmission to said distant station.

10. A directional antenna system comprising an electrically conductive screen an axis of which is directable with respect to a distant station, and dipoles so disposed on opposite sides of said screen, at least one of them unequally spaced from the opposite ends of said axis, that upon misalignment of said axis with respect to the bearing of said station the radiation to one of said dipoles is substantially cut off by the screen.

11. An antenna system having a unidirectional characteristic comprising an electrically conductive screen an axis of which is directable with respect to a distant station, dipoles shielded from each other by said screen and symmetrically disposed with respect thereto with their axes in a plane substantially normal to said axis, and a pair of reflector dipoles mutually shielded by said screen and symmetrically disposed with respect thereto.

12. A radio direction-finding system for determining the sense of direction and bearing of a transmitting station comprising an electrically conductive screen an axis of which is directable with respect to said station, dipoles so disposed on opposite sides of said screen as to effect substantial equality of absorption of radiation from said station upon alignment of said axis of said screen with the bearing of said station and to effect substantial cut-off by said screen of radiation from said station to one of said dipoles upon misalignment of said axis with respect to the bearing of said station, and means for determining the sense of direction of said transmitting station comprising a further dipole on the same side of said screen with one of said first-named dipoles and coacting therewith to impart to its absorption characteristic a dissymmetry indicative of sense of direction of said station.

13. A radio direction-finding system for determining the sense of direction and bearing of a transmiting station comprising an electrically conductive screen an axis of which is directable with respect to said station, dipoles so disposed on opposite sides of said screen that one of them is shielded thereby from said station upon misalignment of said axis with the bearing of said station, means for comparing the magnitudes of the energies absorbed by said dipoles, and means for imparting to the joint absorption characteristic of said dipoles a dissymmetry indicative of the sense of direction of said station comprising a further dipole on the same side of said screen with one of said first-named dipoles and with it disposed in a plane substantially parallel to said axis.

14. A radio direction-finding system for determining the sense of direction and bearing of a transmitting station comprising an electrically conductive screen an axis of which is directable with respect to said station, a pair of dipoles so disposed on opposite sides of said screen that one of them is shielded from said station by said screen upon misalignment of said axis with the bearing of said station, means for comparing the magnitudes of the energies absorbed by said dipoles, and means for determining the sense of direction of said transmitting station comprising a second pair of dipoles on opposite sides of said screen for imparting to the joint absorption characteristic of said first-named dipoles a dissymmetry indicative of sense of direction of said station.

15. A directional antenna system comprising an electrically conductive screen whose effective width is at least one-half wavelength and the effective length of whose longitudinal axis is several wavelengths, and dipoles, relatively close to said screen and symmetrically disposed on opposite sides thereof with their axes in a plane substantially normal to said axis of the screen, said screen and dipoles having such construction and arrangement that the radiation to one of said dipoles from a distant station is cut off by said screen upon small misalignment of said axis of the screen with respect to the bearing of said station.

16. A radio direction-finding system comprising an electrically conductive screen an axis of which is directable with respect to a transmitting station, dipoles so disposed on opposite sides of said screen as to effect substantial equality of absorption of radiation from said station when said axis is substantially in alignment with the bearing of said station and to effect substantial cut-off by said screen of radiation from said station to one of said dipoles upon small misalignment of said axis with respect to the bearing of said station, and means for comparing the magnitudes of the energies absorbed by said dipoles.

17. A radio antenna system having a directional characteristic comprising a pair of dipoles, and a metallic plate, disposed between said dipoles, and of length and height greater than the length of said dipoles, and in general of such construction and arrangement that it serves substantially to cut off radiation to one of said dipoles from a distant station upon misalignment of the bearing of said station with respect to the longitudinal axis of said plate.

18. A radio antenna system having a directional characteristic comprising a pair of dipoles, and an electrically conductive screen disposed between said dipoles, of substantial width between said dipoles and whose length and height are greater than the length of said dipoles, and in general of such construction and arrangement that it serves substantially to cut off radiation to one of said dipoles from a distant station upon misalignment of the bearing of said station with respect to the longitudinal axis of said screen.

19. An antenna system for determination of bearing by directional radio reception from a distant transmitting station comprising at least two antennae, and an electrical conductor of such dimensions and so disposed between said antennae that with respect to said distant transmitting station it cuts off radiation to one or another of said antennae upon change in the position or positions relatively to each other of said station, said conductor and said antennae.

20. A radio direction-finding system for determining the bearing of a transmitting station comprising at least two antennae for absorption of radiation emitted from said station, an electrical conductor of such dimensions and so disposed between said antennae that it cuts off radiation to one or another of them from said station upon change in the angular position or positions relatively to each other of said station, said conductor and said antennae, and means for comparing the magnitudes of the absorbed energies.

21. An antenna system for directional radio reception or transmission from or to a distant transmitting or receiving station comprising at least two antennae, and an electrical conductor of such dimensions and so disposed between said antennae that with respect to said distant station it cuts off radiation to or from one or another of said antennae upon change in the angular position or positions relatively to each other of said station, said conductor and said antennae, the position of one of said antennae with respect to said conductor providing that during aforesaid cut-off of radiation to or from another of them by said conductor, the radiation to or from said one of them is, with respect to aforesaid distant radio station, enhanced by reflection from said conductor.

22. An antenna system for directional radio reception or transmission from or to a distant transmitting or receiving station comprising a pair of antennae, an electrical conductor of such dimensions and so disposed between said antennae that with respect to said distant station it cuts off radiation to or from one or the other of said antennae upon change in the angular position or positions relatively to each other of said station, said conductor and said antennae, and means for procuring, for reversed relation of said antennae with respect to said station, a different magnitude of radiation to or from them comprising another antenna disposed on each of the opposite sides of said conductor and spaced from that one of said first antennae on the same side of said conductor.

23. A system comprising a transmitting station, a mobile receiving station having at least two antennae for absorption of radiation emitted from said transmitting station, an electrical conductor of such dimensions and so disposed between said antennae that radiation to one or another of them is cut off upon change with respect to the bearing of said transmitting station of the position of said conductor relative to said antennae, and means for determining the course of the mobile station with respect to the bearing of said transmitting station comprising means for comparing the magnitudes of radiation absorbed by said antennae.

FREDERICK A. KOLSTER.